(12) United States Patent
Otsuki et al.

(10) Patent No.: US 10,934,105 B2
(45) Date of Patent: Mar. 2, 2021

(54) TRANSFER APPARATUS AND METHOD OF OPERATING SAME

(71) Applicant: KAWASAKI JUKOGYO KABUSHIKI KAISHA, Kobe (JP)

(72) Inventors: Naohiro Otsuki, Kakamigahara (JP); Masayoshi Zaitsu, Kakamigahara (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 232 days.

(21) Appl. No.: 16/252,010

(22) Filed: Jan. 18, 2019

(65) Prior Publication Data

US 2019/0225434 A1    Jul. 25, 2019

(30) Foreign Application Priority Data

Jan. 22, 2018  (JP) .................................. 2018-008256

(51) Int. Cl.
*B65G 47/90* (2006.01)
*B25J 15/00* (2006.01)

(52) U.S. Cl.
CPC .............. *B65G 47/90* (2013.01); *B25J 15/00* (2013.01); *B65G 47/904* (2013.01); *B65G 2201/02* (2013.01)

(58) Field of Classification Search
CPC .... B65G 47/90; B65G 47/901; B65G 47/902; B65G 47/904; B65G 47/905; B65G 2201/02; B65G 2201/0217; B25J 15/00; B25J 15/0253; B25J 9/0096; B25J 9/144
See application file for complete search history.

(56) References Cited

U.S. PATENT DOCUMENTS

| 4,572,564 A | * | 2/1986 | Cipolla | B25B 1/2421 269/266 |
| 5,127,695 A | * | 7/1992 | Zoeten | B66C 1/24 294/119.1 |
| 5,403,057 A | * | 4/1995 | Sugito | B25B 1/2421 269/266 |
| 6,347,821 B1 | * | 2/2002 | Paek | B25J 15/0253 294/119.1 |

(Continued)

FOREIGN PATENT DOCUMENTS

JP        2016-135518 A        7/2016

*Primary Examiner* — Dean J Kramer
(74) *Attorney, Agent, or Firm* — Oliff PLC (57) ABSTRACT

A transfer apparatus includes first and second holding portions, a hand, a hand moving portion, and fluid pressure driving and control units. The control unit acquires an inter-holding portion distance between the first and second holding portions for holding a workpiece. The control unit makes the hand moving portion move the hand to a predetermined position such that the distance between the first and second holding portions becomes the inter-holding portion distance when the first holding portion moved by the fluid pressure driving unit is brought into contact with a contact portion provided at a work field, the predetermined position being located away from the contact portion. With the hand located at the predetermined position, the control unit makes the fluid pressure driving unit move the first holding portion to contact with the contact portion, and the control unit stops driving of the fluid pressure driving unit.

5 Claims, 7 Drawing Sheets

(56) References Cited

U.S. PATENT DOCUMENTS

| | | | |
|---|---|---|---|
| 7,118,147 B2* | 10/2006 | Fujii | B25J 15/0253 |
| | | | 294/103.1 |
| 2016/0214262 A1 | 7/2016 | Saito et al. | |
| 2019/0202069 A1* | 7/2019 | Bando | B25J 11/0045 |
| 2019/0283984 A1* | 9/2019 | Kamachi | B65G 1/0457 |

* cited by examiner

TRANSFER APPARATUS AND METHOD OF OPERATING SAME

FIELD OF THE INVENTION

The present invention relates to a transfer apparatus and a method of operating the transfer apparatus.

DESCRIPTION OF THE RELATED ART

A transfer system of PTL 1 is known as a conventional transfer apparatus. The transfer system includes: a transfer robot including a hand and an arm; and a pair of holding jigs attached to a transferred object. The hand includes: a pair of projecting portions each including a tip at which a hook-shaped portion is provided; and a pair of pressing portions located adjacent to the projecting portions. The holding jigs are attached to the transferred object, and each of the holding jigs includes a pressed portion and a rod-shaped portion.

According to this transfer system, the holding jigs are attached to the transferred object, and the rod-shaped portions of the holding jigs are hooked to the hook-shaped portions of the hand. Then, the pressing portions of the hand press the pressed portions of the holding jigs. With this, the hand holds the transferred object through the holding jigs and transfers the transferred object.

CITATION LIST

Name of Documents (Publication Numbers, etc.)

PTL 1: Japanese Laid-Open Patent Application Publication No. 2016-135518

According to the above transfer system, the single hand holds the transferred objects of various shapes by using the holding jigs corresponding to the individual shapes of the transferred objects. Therefore, the holding jigs corresponding to the shapes of the transferred objects need to be prepared, and this increases costs.

Typically, when transferring the transferred objects of various shapes, held positions of the transferred object need to be changed by changing an interval between the projecting portions of the hand in accordance with the shape of the transferred object. Further, for example, when transferring the transferred object from a temporary placing table to a machining apparatus, the held positions of the transferred object needs to be set in consideration of the positions of posts of the temporary placing table and the positions of fixing jigs of the machining apparatus. The use of a high-precision driving device, such as a servomotor, to control the held positions is a factor that increases apparatus costs.

The present invention was made to solve the above problems, and an object of the present invention is to provide a transfer apparatus and a method of operating the transfer apparatus, each of which can transfer various types of workpieces while suppressing a cost increase.

A transfer apparatus according to an aspect of the present invention includes: a first holding portion configured to hold a workpiece arranged at a work field; a second holding portion configured to hold the workpiece in cooperation with the first holding portion; a hand including the first holding portion and the second holding portion; a hand moving portion configured to move the hand; a fluid pressure driving unit configured to move the first holding portion by pressure of a fluid to change a distance between the first holding portion and the second holding portion; and a control unit configured to control the hand moving portion and the fluid pressure driving unit, wherein: the control unit acquires an inter-holding portion distance that is a distance between the first holding portion and the second holding portion for holding the workpiece; the control unit makes the hand moving portion move the hand to a predetermined position such that the distance between the first holding portion and the second holding portion becomes the inter-holding portion distance when the first holding portion moved by the fluid pressure driving unit is brought into contact with a contact portion provided at the work field, the predetermined position being located away from the contact portion; with the hand located at the predetermined position, the control unit makes the fluid pressure driving unit move the first holding portion to bring the first holding portion into contact with the contact portion; and the control unit stops driving of the fluid pressure driving unit when the first holding portion is brought into contact with the contact portion.

According to this configuration, since the interval between the first holding portion and the second holding portion is adjusted in accordance with the shape of the workpiece and the like, the single hand can hold and transfer various types of workpieces. Further, even when an inexpensive driving unit configured to drive by pressure of a fluid is used, the interval between the first holding portion and the second holding portion can be adjusted with a high degree of accuracy by bringing the first holding portion into contact with the contact portion. As above, holding jigs corresponding to the shapes of the transferred objects are not required, and an expensive and high-precision driving device is unnecessary. Therefore, various types of workpieces can be transferred while suppressing a cost increase.

The transfer apparatus may be configured such that the fluid pressure driving unit moves the second holding portion in addition to the first holding portion in such a direction that the inter-holding portion distance increases or decreases. Further, the transfer apparatus may further include a sensor configured to detect contact of the first holding portion with the contact portion. Furthermore, the transfer apparatus may be configured such that: the first holding portion includes a pair of first jaw portions configured to reciprocate in such a direction as to approach each other or separate from each other; and the second holding portion includes a pair of second jaw portions configured to reciprocate in such a direction as to approach each other or separate from each other, and the transfer apparatus may further include a jaw driving unit configured to drive and reciprocate the first jaw portions and the second jaw portions.

A method of operating a transfer apparatus according to another aspect of the present invention is a method of operating a transfer apparatus, the transfer apparatus including: a first holding portion configured to hold a workpiece arranged at a work field; a second holding portion configured to hold the workpiece in cooperation with the first holding portion; and a hand including the first holding portion and the second holding portion, the method including: acquiring an inter-holding portion distance that is a distance between the first holding portion and the second holding portion for holding the workpiece; moving the hand to a predetermined position such that the distance between the first holding portion and the second holding portion becomes the inter-holding portion distance when the moving first holding portion is brought into contact with a contact portion provided at the work field, the predetermined position being located away from the contact portion; with the hand located at the predetermined position, moving the first holding portion by pressure of a fluid to bring the first holding portion into contact with the contact portion; and stopping the first holding portion when the first holding portion is brought into contact with the contact portion.

The above object, other objects, features, and advantages of the present invention will be made clear by the following detailed explanation of preferred embodiments with reference to the attached drawings.

DESCRIPTION OF THE PREFERRED EMBODIMENTS

Hereinafter, an embodiment of the present invention will be specifically explained with reference to the drawings. In the following explanations and the drawings, the same reference signs are used for the same or corresponding components, and a repetition of the same explanation is avoided.

Embodiment

Configuration of Transfer System

Figure 1:
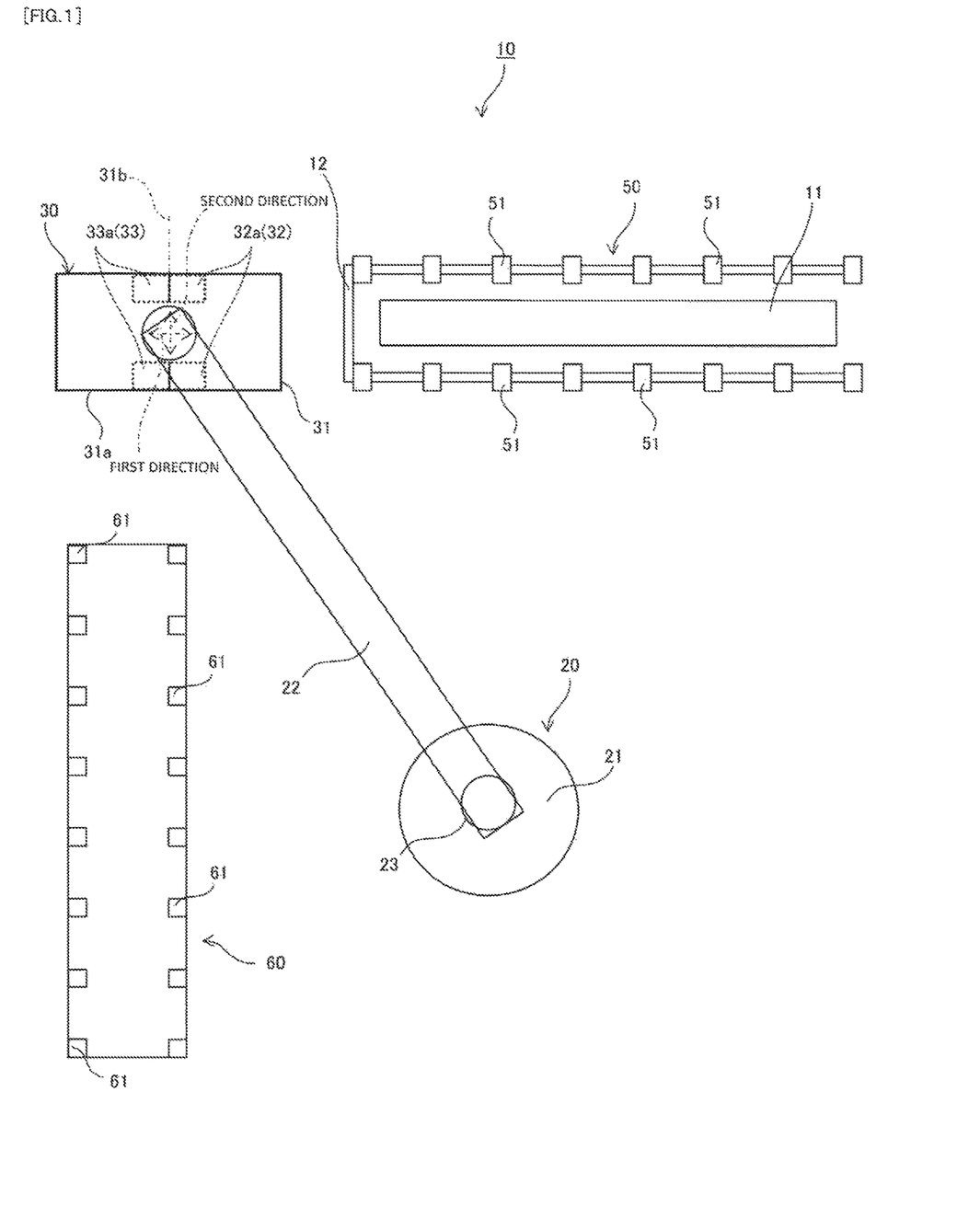
FIG. 1 is a diagram schematically showing a transfer system including a transfer apparatus according to an embodiment of the present invention.

As shown in FIG. 1, a transfer system 10 including a transfer apparatus according to Embodiment 1 is a system configured to transfer a workpiece 11 arranged at a work field and includes, for example, a robot 20 and a contact portion 12. The contact portion 12 is, for example, a plate-shaped block and is arranged at the work field. For example, when transferring the workpiece 11 from a temporary placing table 50 to a machining apparatus 60, the contact portion 12 may be provided at an end of the temporary placing table 50 so as to be located between the temporary placing table 50 and the machining apparatus 60.

Configuration of Robot

Figure 2:
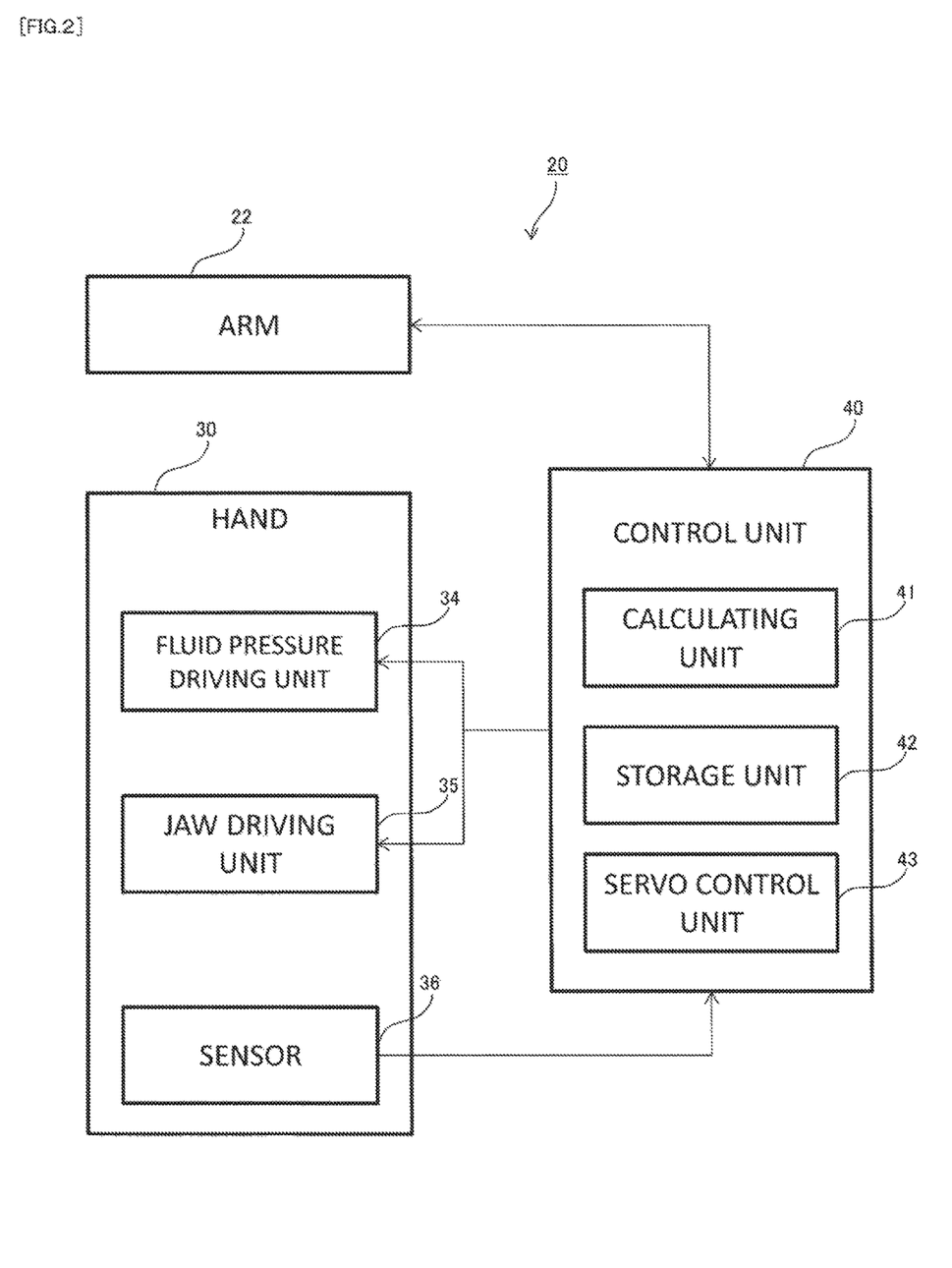
FIG. 2 is a functional block diagram showing the configuration of the transfer apparatus of FIG. 1.

As shown in FIGS. 1 and 2, the robot 20 is, for example, a transfer apparatus, such as a vertical articulated robot or a horizontal articulated robot, and includes a placing table 21, an arm 22, a hand 30, and a control unit 40. The placing table 21 is fixed to a floor, and a base shaft 23 is provided on an upper surface of the placing table 21. The arm 22 is attached to the placing table 21 so as to be rotatable about the base shaft 23. Details of the hand 30 will be described later.

The arm 22 is a hand moving portion configured to be able to move the hand 30 and includes a plurality of links (not shown) and one or more joints (not shown). The joint is a rotational joint or a linear motion joint. The links are coupled to each other through the joint. The joint is provided with an actuator, such as a servomotor (not shown), which excels in position control and is configured to relatively rotate or relatively and linearly move two links coupled to each other. With this, the arm 22 can move the hand 30 in, for example, an upper-lower direction, a left-right direction, and a front-rear direction which are perpendicular to one another, i.e., the arm 22 can control the position of the hand 30 with a high degree of accuracy.

The joint is further provided with: a position sensor (not shown), such as an encoder, configured to detect a drive position of the actuator; and a current sensor (not shown) configured to detect a current which controls driving of the actuator. Detection signals of these sensors are output to the control unit 40.

The control unit 40 includes: a calculating unit 41, such as a CPU; a storage unit 42, such as a ROM and a RAM; and a servo control unit 43. For example, the control unit 40 is a control device, such as a robot controller, including a computer, such as a microcontroller. The control unit 40 may be constituted by a single control unit which performs centralized control or may be constituted by a plurality of control units which cooperate to perform distributed control. The storage unit 42 is arranged at the control unit 40. However, the present embodiment is not limited to this, and the storage unit 42 may be provided separately from the control unit 40.

The storage unit 42 stores a basic program of the robot controller and information, such as various fixed data. The calculating unit 41 controls various operations of the robot 20 by: reading software, such as the basic program, stored in the storage unit 42; and executing the software based on detection signals of various sensors of the arm 22 and the hand 30. To be specific, the calculating unit 41 generates a control command of the robot 20 and outputs the control command to the servo control unit 43. Based on the control command generated by the calculating unit 41, the servo control unit 43 controls the driving of the actuators of the arm 22 and hand 30 of the robot 20.

Configuration of Hand

As shown in FIGS. 1 to 3B, for example, the hand 30 is detachably attached to a tip end of the arm 22 and includes a base member 31, a first holding portion 32, a second holding portion 33, a fluid pressure driving unit 34, a jaw driving unit 35, and a sensor 36. Driving and stop of the fluid pressure driving unit 34 and the jaw driving unit 35 are controlled by the control unit 40. It should be noted that the hand 30 may be fixed to the arm 22.

Figure 3A:
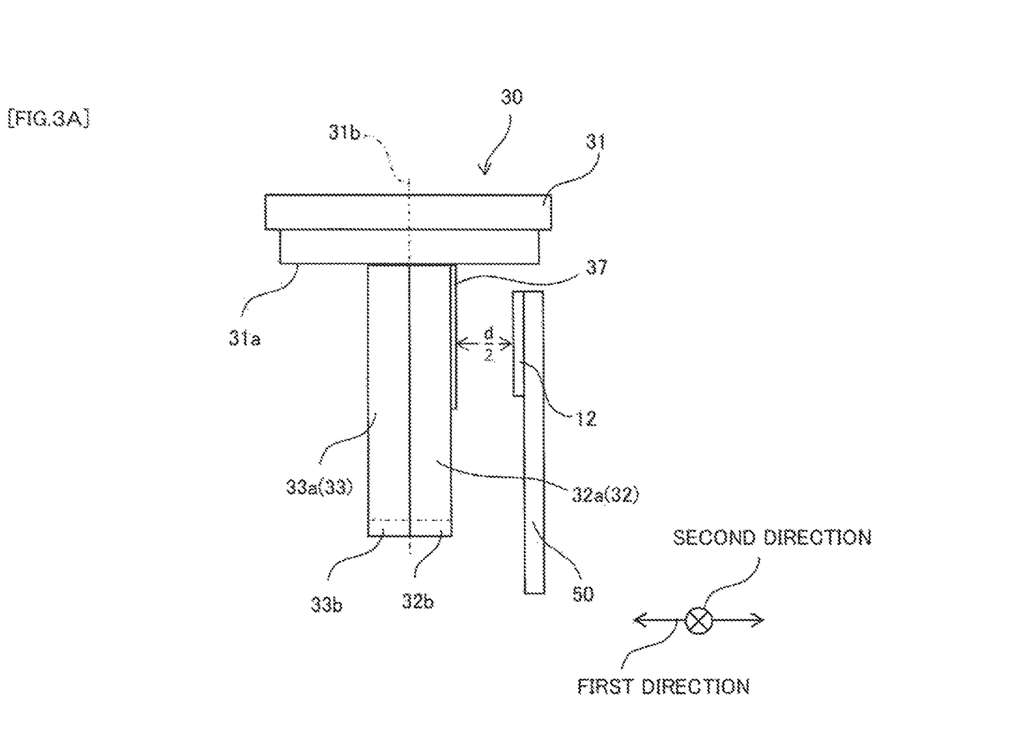
FIGS. 3A and 3B are diagrams each showing a hand of FIG. 1.
Figure 3B:
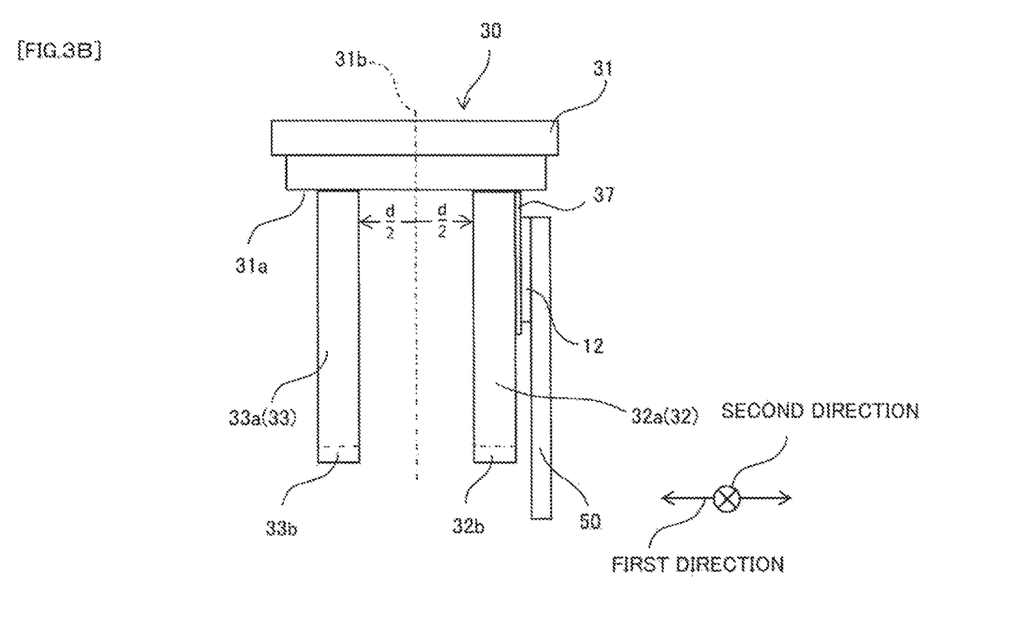

The base member 31 has, for example, a flat plate shape or a rectangular solid shape and includes: an attached surface attached to the arm 22; and an attaching surface 31a located at an opposite side of the attached surface. The fluid pressure driving unit 34 and the jaw driving unit 35 are provided at the base member 31. It should be noted that directions perpendicular to each other on the attaching surface 31a are defined as a first direction and a second direction.

The first holding portion 32 and the second holding portion 33 are members which cooperate to hold the workpiece 11. The first holding portion 32 and the second holding portion 33 are arranged on the attaching surface 31a of the base member 31 so as to be lined up in the first direction. For example, a base (not shown) extending in the first direction is provided at the base member 31, and the first holding portion 32 and the second holding portion 33 are attached to the base. The first holding portion 32 and the second holding portion 33 are movable in the first direction along the base. With this, a distance (first interval) between the first holding portion 32 and the second holding portion 33 in the first direction changes.

The fluid pressure driving unit 34 is, for example, a linear actuator configured to operate by pressure of a fluid. The fluid pressure driving unit 34 moves the first holding portion 32 to change the first interval. Examples of the fluid pressure driving unit 34 include: a pneumatic driving device which uses air as the fluid; and a hydraulic driving device which uses oil as the fluid.

The fluid pressure driving unit 34 includes a pump (not shown), a cylinder (not shown), and a piston (not shown). The fluid is supplied or sucked by the pump into the cylinder, and with this, the piston in the cylinder reciprocates. Thus, the fluid pressure driving unit 34 moves the first holding portion 32 in such a direction that the first interval widens or narrows in the first direction. Further, the fluid pressure driving unit 34 stops the supply or suction of the fluid to stop the movement of the first holding portion 32.

The first holding portion 32 moves in such a direction that the first interval narrows. Then, the first holding portion 32 is brought into contact with the second holding portion 33 at a predetermined reference position (first reference position 31b) in the first direction. On the other hand, when the first holding portion 32 is located in the vicinity of the contact portion 12, the first holding portion 32 moves in such a direction that the first interval widens. Then, the first holding portion 32 is brought into contact with the contact portion 12. A reinforcing portion 37 may be provided at a part of the first holding portion 32 which part is brought into contact with the contact portion 12. Damages of the first holding portion 32 by the contact with the contact portion 12 can be reduced by the reinforcing portion 37.

The fluid pressure driving unit 34 may also move the second holding portion 33 in addition to the first holding portion 32. In this case, the first holding portion 32 and the second holding portion 33 move at the same speed by the same distance from the first reference position 31b. With this, the first interval becomes twice a movement distance d/2 of the first holding portion 32, i.e., a distance d. Therefore, when the first reference position 31b is a predetermined position at the base member 31, the first interval is determined based on the position of the first holding portion 32.

The sensor 36 is a detecting portion configured to detect the contact of the first holding portion 32 with the contact portion 12. The sensor 36 outputs a detection signal to the control unit 40. For example, the sensor 36 may be a proximity sensor provided at the first holding portion 32 and configured to detect the contact of the first holding portion 32 with the contact portion 12. Or, the sensor 36 may detect the contact of the first holding portion 32 with the contact portion 12 when a load acting on the fluid pressure driving unit 34 is a predetermined load or more, and this continues for a predetermined period of time. It should be noted that when the sensor 36 is the proximity sensor, the sensor 36 may be provided at, for example, the contact portion 12, i.e., may be provided separately from the hand 30.

The first holding portion 32 includes a pair of first jaw portions 32a, and the first jaw portions 32a are arranged so as to be opposed to each other in the second direction. For example, a base (not shown) extending in the second direction is provided at the base member 31, and the first jaw portions 32a are attached to the base. The first jaw portions 32a can reciprocate along the base in such a direction as to approach each other or separate from each other. With this, an interval (second interval) between the first jaw portions 32a in the second direction changes.

Each of the first jaw portions 32a projects from the attaching surface 31a of the base member 31 and has an L shape when viewed from the first direction. The first jaw portions 32a are bent such that respective tip end portions 32b thereof extend toward each other in the second direction.

The jaw driving unit 35 is a driving unit configured to drive the first jaw portions 32a and is, for example, a linear actuator configured to operate by pressure of a fluid. Examples of the jaw driving unit 35 include: a pneumatic driving device which uses air as the fluid; and a hydraulic driving device which uses oil as the fluid.

The jaw driving unit 35 includes a pump (not shown), a cylinder (not shown), and a piston (not shown). The fluid is supplied or sucked by the pump into the cylinder, and with this, the piston in the cylinder reciprocates. Thus, the jaw driving unit 35 reciprocates the first jaw portions 32a in such a direction that the second interval widens or narrows in the second direction.

The jaw driving unit 35 may move both of the first jaw portions 32a. When any one of the first jaw portions 32a is fixed, the jaw driving unit 35 may move the other first jaw portion 32a. Further, the jaw driving unit 35 stops the supply or suction of the fluid to stop the movement of the first jaw portions 32a.

The second holding portion 33 includes a pair of second jaw portions 33a. The second jaw portions 33a are arranged so as to be opposed to each other in the second direction. The second jaw portions 33a are bent such that respective tip end portions 33b thereof extend toward each other in the second direction. Since the second jaw portions 33a are the same as the first jaw portions 32a, explanations thereof are omitted. Further, the jaw driving unit 35 drives the second jaw portions 33a in the same manner as the first jaw portions 32a. Therefore, the first jaw portions 32a and the second jaw portions 33a move such that the second interval between the first jaw portions 32a and an interval (third interval) between the second jaw portions 33a become equal to or substantially equal to each other.

Method of Operating Transfer Apparatus

Figure 7:
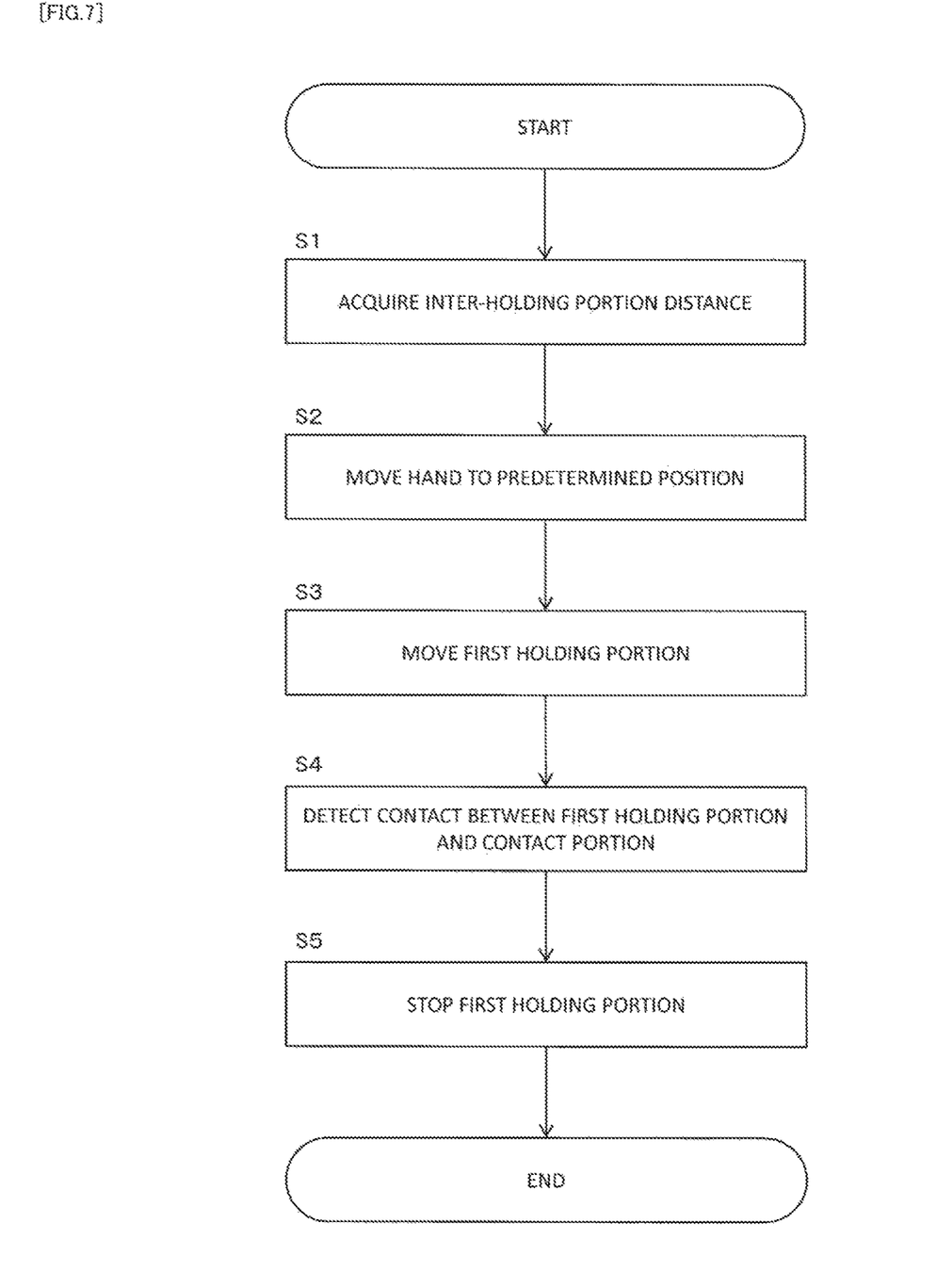
FIG. 7 is a flow chart showing one example of a method of operating the transfer apparatus of FIG. 1.

The operation of the robot 20 configured to transfer the workpiece 11 from the temporary placing table 50 to the machining apparatus 60 in the transfer system 10 will be explained with reference to FIG. 7. This operation is controlled by the control unit 40. The control unit 40 controls the positions of the arm 22 and the hand 30 based on the detection signals of the sensors and predetermined information. Information, such as the shape and size of the workpiece 11, is stored in the control unit 40 in advance based on design data and the like. Or, the information of the workpiece 11 may be input by an operator according to need, and the control unit 40 may acquire the information.

Figure 5:
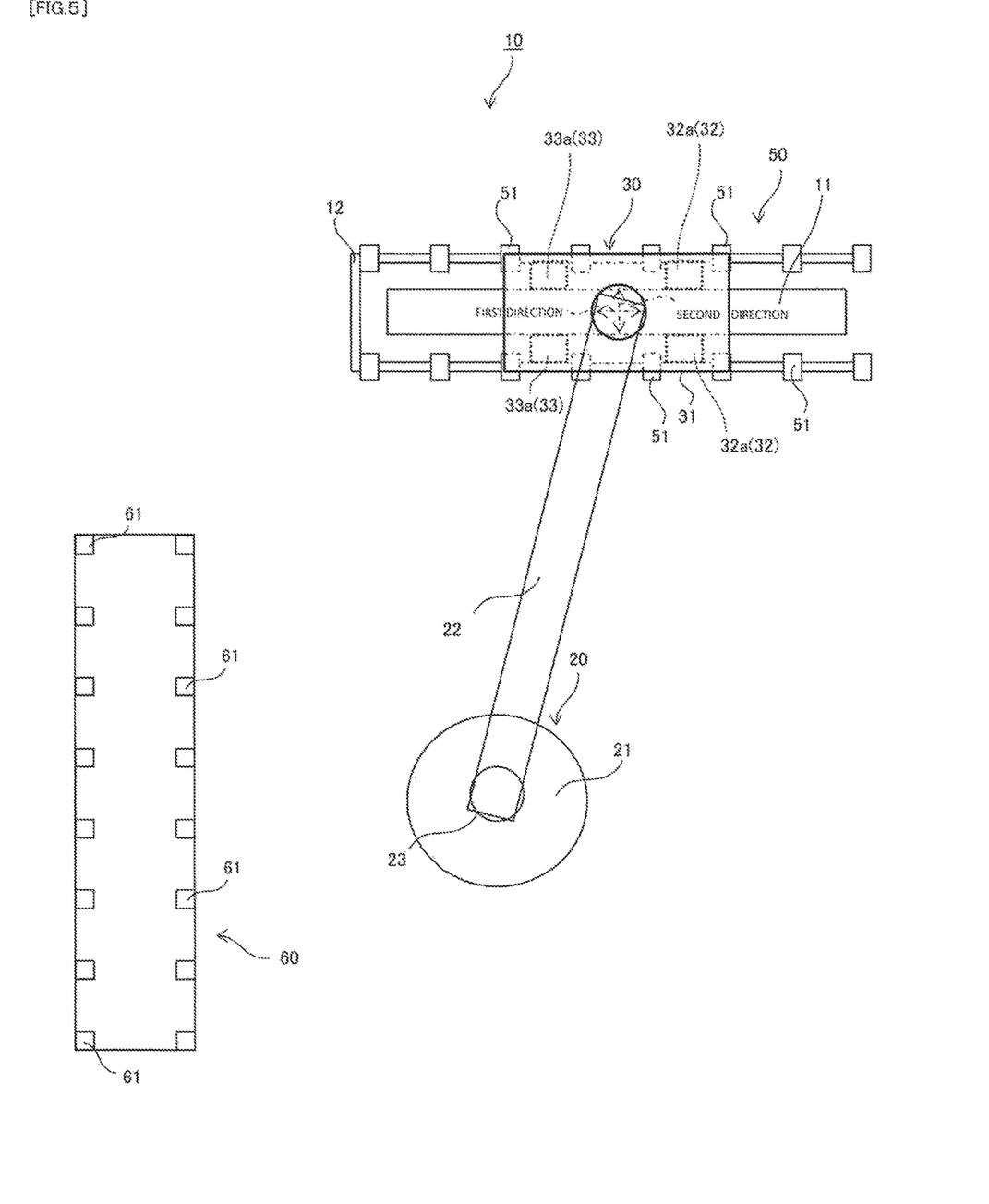
FIG. 5 is a diagram showing a state where the hand of FIG. 4 holds a workpiece on a temporary placing table.

A plurality of posts 51 supporting the workpiece 11 are provided at the temporary placing table 50. The position of the temporary placing table 50 relative to the robot 20 and the positions of the posts 51 at the temporary placing table 50 are stored in the control unit 40 in advance. For example, two rows of the posts 51 are provided at the temporary placing table 50 so as to sandwich the workpiece 11, and the posts 51 in each row are lined up along the workpiece 11. A space between the two rows of the posts 51 at one end in a row direction in which the posts 51 in each row are lined up is closed by the contact portion 12, and the other space therebetween at the other end is open.

Figure 6:
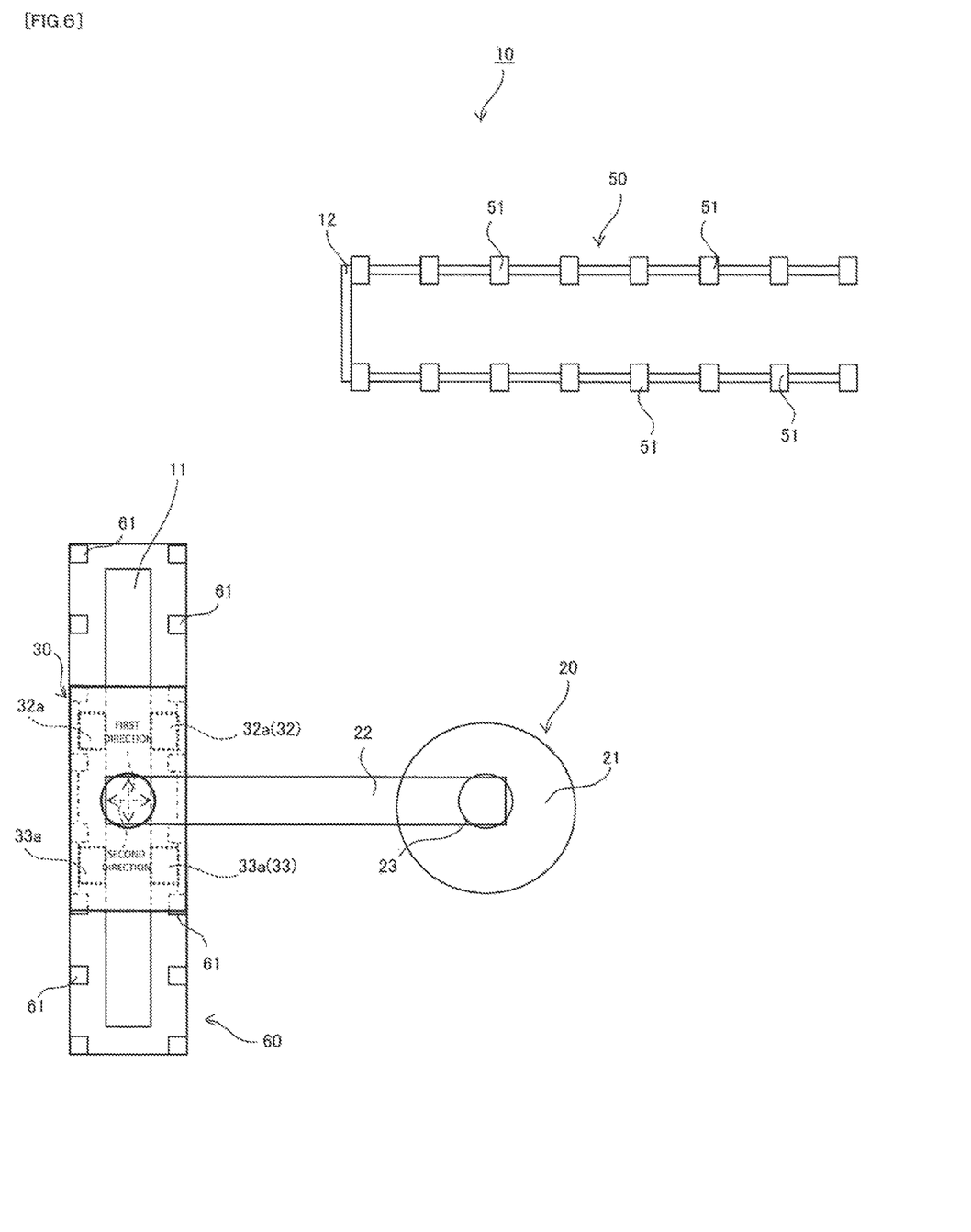
FIG. 6 is a diagram showing a state where the workpiece of FIG. 5 is transferred to a machining apparatus.

A plurality of attaching jigs 61 to which the workpiece 11 is attached are provided at the machining apparatus 60. The positions of the attaching jigs 61 at the machining apparatus 60 correspond to the positions of the posts 51 at the temporary placing table 50. Therefore, an interval between the adjacent posts 51 in each row and an interval between the adjacent attaching jigs 61 in each row are set to be equal to each other. It should be noted that the positions of all the attaching jigs 61 and the positions of all the posts 51 do not have to completely correspond to one another. For example, at positions where the workpiece 11 is not held at ends of the attaching jigs 61 and the machining apparatus 60, the positions of the attaching jigs 61 and the positions of the post 51 may be different from each other.

Further, the contact portion 12 is provided at an end of the temporary placing table 50, and the position of the contact portion 12 relative to the robot 20 is stored in the control unit 40 in advance. Therefore, the control unit 40 sets the position of the robot 20 (for example, the position of the placing table 21) as an origin in an orthogonal coordinate system and stores coordinate positions of the temporary placing table 50, the posts 51, the machining apparatus 60, the attaching jigs 61, and the contact portion 12 in advance.

First, the control unit 40 acquires an inter-holding portion distance (Step S1). The inter-holding portion distance denotes a distance between the first holding portion 32 and the second holding portion 33 for holding the workpiece 11 that is a target. The inter-holding portion distance is acquired by the control unit 40 based on the information of the workpiece 11 and the positional information of the temporary placing table 50 and the posts 51. For example, the inter-holding portion distance is set to be shorter than the size of the workpiece 11 in the first direction such that the first holding portion 32 and the second holding portion 33 can hold the workpiece 11.

The inter-holding portion distance is set such that when the first holding portion 32 and the second holding portion 33 hold the workpiece 11 at the temporary placing table 50, each of the first holding portion 32 and the second holding portion 33 is located between the adjacent posts 51 without contacting the posts 51. For example, the inter-holding portion distance is set such that when the posts 51 are counted from the contact portion 12 side, the second holding portion 33 is located between the third post 51 and the fourth post 51, and the first holding portion 32 is located between the fifth post 51 and the sixth post 51.

Figure 4:
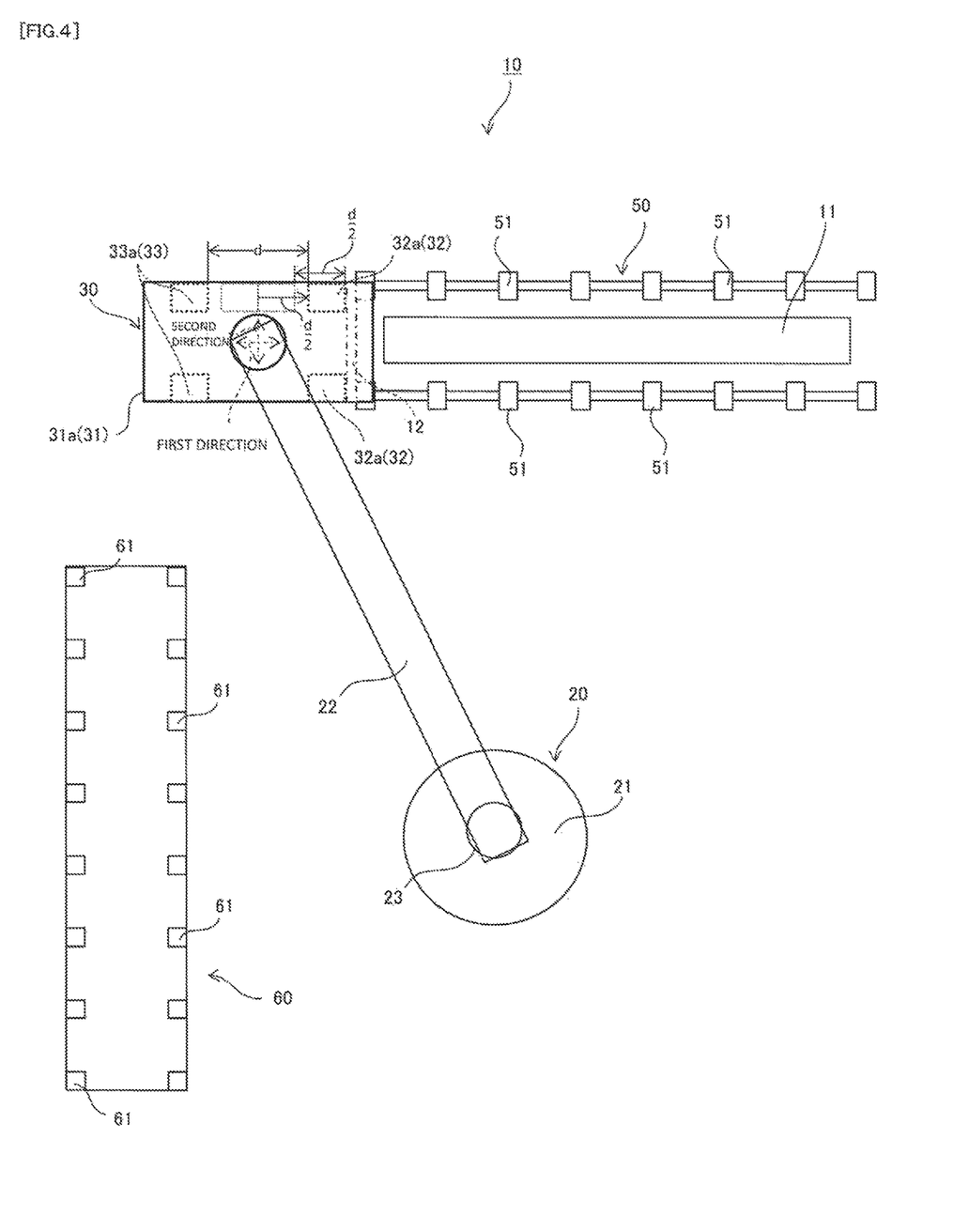
FIG. 4 is a diagram showing a state where a first holding portion of FIG. 1 is in contact with a contact portion.

Next, as shown in FIG. 4, the control unit 40 makes the arm 22 move the hand 30 to a predetermined position (Step S2). The predetermined position denotes a position of the hand 30 located away from the contact portion 12 such that the first interval becomes the inter-holding portion distance when the first holding portion 32 moving in such a direction that the first interval widens is brought into contact with the contact portion 12. For example, when the inter-holding portion distance is the distance d, the predetermined position is such a position that the first holding portion 32 is located away from the contact portion 12 by the distance d/2.

As shown in FIG. 3A, the first holding portion 32 and the second holding portion 33 in the hand 30 move close to each other to narrow the first interval. Then, the first holding portion 32 and the second holding portion 33 are brought into contact with each other to be located at the first reference position 31b.

Next, as shown in FIGS. 3B and 4, with the hand 30 located at the predetermined position, the control unit 40 makes the fluid pressure driving unit 34 move the first holding portion 32 (Step S3). The hand 30 is directed such that the first holding portion 32 is located closer to the contact portion 12 than the second holding portion 33. Then, the first holding portion 32 and the second holding portion 33 are moved so as to widen the first interval, and the first holding portion 32 is brought into contact with the contact portion 12.

Next, the control unit 40 detects the contact between the first holding portion 32 and the contact portion 12 by the sensor 36 (Step S4). To be specific, in accordance with the signal of the sensor 36 which has detected the contact of the first holding portion 32 with the contact portion 12, the control unit 40 determines that the first holding portion 32 has been brought into contact with the contact portion 12.

Next, the control unit 40 stops the first holding portion 32 by the fluid pressure driving unit 34 (Step S5). Thus, the first holding portion 32 moves by the distance d/2 from the first reference position 31b, and the second holding portion 33 also moves by the distance d/2 from the first reference position 31b. Therefore, the first interval becomes the distance d and becomes equal to the inter-holding portion distance.

Then, the control unit 40 drives the jaw portions 32a and 33a by the jaw driving unit 35. The second interval between the first jaw portions 32a of the first holding portion 32 is widened, and the third interval between the second jaw portions 33a of the second holding portion 33 is widened. At this time, each of the second interval and the third interval becomes the longest.

In this state, the hand 30 is moved to the temporary placing table 50 based on the positional information of the temporary placing table 50. In this case, since the contact portion 12 is provided perpendicular to a direction in which the row of the posts 51 extends, the first direction of the hand 30 and the row direction of the posts 51 coincide with each other. Further, the contact portion 12 is provided between two rows of the posts 51. Therefore, when the hand 30 is moved in the row direction of the posts 51, the hand 30 is arranged above the workpiece 11 such that the workpiece 11 is sandwiched between the first jaw portions 32a and between the second jaw portions 33a in the second direction.

At the temporary placing table 50, the hand 30 is arranged so as to be located between the third post 51 and the sixth post 51 from the contact portion 12 side. In the hand 30, the first interval between the first holding portion 32 and the second holding portion 33 is set to the inter-holding portion distance. Therefore, the second holding portion 33 is arranged between the third post 51 and the fourth post 51, and the first holding portion 32 is arranged between the fifth post 51 and the sixth post 51.

Then, the tip end portions 32b of the first jaw portions 32a and the tip end portions 33b of the second jaw portions 33a are located under the workpiece 11. The jaw driving unit 35 is driven so as to narrow the interval between the first jaw portions 32a and the interval between the second jaw portions 33a. With this, the workpiece 11 is sandwiched between the first jaw portions 32a and between the second jaw portions 33a and loaded on the tip end portions 32b of the first jaw portions 32a and the tip end portions 33b of the second jaw portions 33a.

In this state, the arm 22 moves the hand 30 based on the positional information of the posts 51 such that: the workpiece 11 is lifted above the posts 51 of the temporary placing table 50; or the workpiece 11 moves between two rows of the posts 51 to get out through the end opposite to the end at the contact portion 12 side. Then, the arm 22 moves the hand 30 based on the positional information of the temporary placing table 50 and the machining apparatus 60 such that the workpiece 11 moves from the temporary placing table 50 to the machining apparatus 60.

Based on the positional information of the attaching jigs 61 at the machining apparatus 60, the hand 30 is arranged so as to be located between two rows of the attaching jigs 61 and also located between the third attaching jig 61 and the sixth attaching jig 61 in a row direction in which the attaching jigs 61 are lined up.

In the hand 30, the first interval between the first holding portion 32 and the second holding portion 33 is set to the inter-holding portion distance, and the positions of the posts 51 and the positions of the attaching jigs 61 correspond to one another. Therefore, at the machining apparatus 60, the second holding portion 33 is arranged between the third attaching jig 61 and the fourth post 51, and the first holding portion 32 is arranged between the fifth attaching jig 61 and the sixth attaching jig 61.

Then, the jaw driving unit 35 is driven so as to widen the second interval between the first jaw portions 32a and the third interval between the second jaw portions 33a. With this, the workpiece 11 is unloaded from the tip end portions 32b and the tip end portions 33b to be arranged at the machining apparatus 60.

As above, the positions of the first holding portion 32 and the second holding portion 33 can be changed in accordance with the size of the workpiece 11, and therefore, the workpieces 11 of various sizes can be transferred. For example, the workpieces 11 of various sizes having the weight of 10 kg or more and 150 kg or less, the width of 24.5 mm or more and 80 mm or less, and the length of 300 mm or more and 1,600 mm or less can be transferred.

Further, the workpiece 11 is held by two holding portions (the first holding portion 32 and the second holding portion 33). Therefore, the workpiece 11 can be stably held even when the workpiece 11 is large and heavy. In addition, the positions of the first holding portion 32 and the second holding portion 33 can be set so as not to contact the posts 51 and the attaching jigs 61. Therefore, the first holding portion 32 and the second holding portion 33 can hold and transfer the workpiece 11 between the temporary placing table 50 including the posts 51 and the machining apparatus 60 including the attaching jigs 61.

Further, the workpiece 11 is loaded on the tip end portions 32b of the first jaw portions 32a and the tip end portions 33b of the second jaw portions 33a. With this, it is unnecessary to sandwich the workpiece 11, and therefore, the workpiece 11 can be held without being damaged even when the workpiece 11 is heavy. Further, since a member for holding the workpiece 11 and corresponding to the size of the workpiece 11 is not required, the cost increase of the robot 20 can be suppressed.

Further, the first holding portion 32 is positioned by being brought into contact with the contact portion 12. With this, the first holding portion 32 can be accurately stopped at a target position even by an actuator which uses pressure of a fluid and by which it is difficult to perform accurate position control. As above, an inexpensive actuator using pressure of a fluid can be used as the fluid pressure driving unit 34 instead of, for example, a servomotor which excels in positional accuracy but is expensive. Thus, the cost reduction of the hand 30 can be realized, and therefore, the cost reduction of the robot 20 can be realized.

Other Embodiment

In the above embodiment, the first holding portion 32 and the second holding portion 33 are driven by the fluid pressure driving unit 34. However, the first holding portion 32 may be movable relative to the base member 31, and the second holding portion 33 may be fixed to the base member 31. In this case, the first interval is equal to the movement distance of the first holding portion 32. Therefore, for example, when the inter-holding portion distance is the distance d, the predetermined position is such a position that the first holding portion 32 is located away from the contact portion 12 by the distance d.

In the above embodiment, the first holding portion 32 and the second holding portion 33 hold the workpiece 11 by loading the workpiece 11 on the tip end portions 32b of the first jaw portions 32a and the tip end portions 33b of the second jaw portions 33a. However, the method of holding the workpiece 11 is not limited to this.

For example, the first holding portion 32 and the second holding portion 33 may hold the workpiece 11 by sandwiching the workpiece 11 by the first jaw portions 32a and the second jaw portions 33a. Or, the first holding portion 32 and the second holding portion 33 may include respective adsorbing members and may hold the workpiece 11 by adsorbing the workpiece 11 by the adsorbing members.

In the above embodiment, the information of the workpiece 11 is stored in the control unit 40 in advance based on the design data and the like. However, the method of acquiring the information of the workpiece 11 is not limited to this. For example, the robot 20 may include an image acquiring portion (not shown), such as a camera. In this case, an identifier, such as a bar code containing information, may be added to the workpiece 11. With this, the robot 20 can acquire size information of the workpiece 11 from the identifier by the image acquiring portion.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

The transfer apparatus and the method of operating the transfer apparatus according to the present invention are useful as, for example, a transfer apparatus and a method of operating the transfer apparatus, each of which can transfer various types of workpieces while suppressing a cost increase.

What is claimed is:
1. A transfer apparatus comprising:
a first holding portion configured to hold a workpiece arranged at a work field;
a second holding portion configured to hold the workpiece in cooperation with the first holding portion;
a hand including the first holding portion and the second holding portion;
a hand moving portion configured to move the hand;
a fluid pressure driving unit configured to move the first holding portion by pressure of a fluid to change a distance between the first holding portion and the second holding portion; and
a control unit configured to control the hand moving portion and the fluid pressure driving unit, wherein:
the control unit acquires an inter-holding portion distance that is a distance between the first holding portion and the second holding portion for holding the workpiece;
the control unit makes the hand moving portion move the hand to a predetermined position such that the distance between the first holding portion and the second holding portion becomes the inter-holding portion distance when the first holding portion moved by the fluid pressure driving unit is brought into contact with a contact portion provided at the work field, the predetermined position being located away from the contact portion;

with the hand located at the predetermined position, the control unit makes the fluid pressure driving unit move the first holding portion to bring the first holding portion into contact with the contact portion; and the control unit stops driving of the fluid pressure driving unit when the first holding portion is brought into contact with the contact portion.

2. The transfer apparatus according to claim 1, wherein the fluid pressure driving unit moves the second holding portion in addition to the first holding portion in such a direction that the inter-holding portion distance increases or decreases.

3. The transfer apparatus according to claim 1, further comprising a sensor configured to detect contact of the first holding portion with the contact portion.

4. The transfer apparatus according to claim 1, wherein:
the first holding portion includes a pair of first jaw portions configured to reciprocate in such a direction as to approach each other or separate from each other; and
the second holding portion includes a pair of second jaw portions configured to reciprocate in such a direction as to approach each other or separate from each other,
the transfer apparatus further comprising a jaw driving unit configured to drive and reciprocate the first jaw portions and the second jaw portions.

5. A method of operating a transfer apparatus,
the transfer apparatus comprising:
a first holding portion configured to hold a workpiece arranged at a work field;
a second holding portion configured to hold the workpiece in cooperation with the first holding portion; and
a hand including the first holding portion and the second holding portion,
the method comprising:
acquiring an inter-holding portion distance that is a distance between the first holding portion and the second holding portion for holding the workpiece;
moving the hand to a predetermined position such that the distance between the first holding portion and the second holding portion becomes the inter-holding portion distance when the moving first holding portion is brought into contact with a contact portion provided at the work field, the predetermined position being located away from the contact portion;
with the hand located at the predetermined position, moving the first holding portion by pressure of a fluid to bring the first holding portion into contact with the contact portion; and
stopping the first holding portion when the first holding portion is brought into contact with the contact portion.

* * * * *